(12) United States Patent
Linzen et al.

(10) Patent No.: US 9,051,861 B2
(45) Date of Patent: Jun. 9, 2015

(54) REGENERATION METHOD AND MOTOR VEHICLE

(71) Applicant: Ford Global Technologies, LLC, Dearborn, MI (US)

(72) Inventors: Frank Linzen, Aachen (DE); Leonhard Bartsch, Aachen (DE); Matthew Allen Schneider, Aachen (DE); Yasser Mohamed sayed Yacoub, Cologne (DE); Jan Harmsen, Simpelved (NL)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/025,720

(22) Filed: Sep. 12, 2013

(65) Prior Publication Data
US 2014/0102079 A1    Apr. 17, 2014

(30) Foreign Application Priority Data
Oct. 12, 2012  (DE) .......................... 10 2012 218 611

(51) Int. Cl.
*F01N 3/00* (2006.01)
*F01N 3/08* (2006.01)
*F01N 9/00* (2006.01)

(52) U.S. Cl.
CPC ............. *F01N 3/0885* (2013.01); *Y10S 903/93* (2013.01); *F01N 3/0871* (2013.01); *F01N 9/00* (2013.01); *F01N 2590/11* (2013.01); *Y02T 10/20* (2013.01); *Y02T 10/47* (2013.01)

(58) Field of Classification Search
CPC ....... F01N 3/0885; F01N 3/0871; F01N 9/00; F01N 2590/11; Y10S 903/93; Y02T 10/47
USPC ............................. 60/285, 286, 272, 273, 274
See application file for complete search history.

(56) References Cited

U.S. PATENT DOCUMENTS

| 6,057,605 A  * | 5/2000 | Bourne et al. ............... 290/40 C |
| 2006/0213186 A1* | 9/2006 | Pott .................................. 60/285 |
| 2007/0017215 A1 | 1/2007 | Matheaus et al. |
| 2012/0209466 A1 | 8/2012 | Ogiso |

FOREIGN PATENT DOCUMENTS

| DE | 10249017 A1 | 6/2003 |
| DE | 102004058231 A1 | 7/2005 |
| EP | 2058199 A1 | 5/2009 |

* cited by examiner

*Primary Examiner* — Thomas Denion
*Assistant Examiner* — Vikansha Dwivedi
(74) *Attorney, Agent, or Firm* — David Kelley; Alleman Hall McCoy Russell & Tuttle LLP (57) ABSTRACT

A regeneration method (10) for regenerating an adsorber (19), connected downstream of an internal combustion engine (13), of a motor vehicle (11) with a hybrid drive train is described. The internal combustion engine (13) is operated in a phase of rich combustion for regeneration of the adsorber (19). According to the description, an engine load (30) and/or an engine rotational speed (31) of the internal combustion engine (13) for the rich combustion is influenced by means of an electric machine (14) which can be coupled mechanically to the internal combustion engine (13).

11 Claims, 4 Drawing Sheets

REGENERATION METHOD AND MOTOR VEHICLE

CROSS-REFERENCE TO RELATED APPLICATIONS

This application claims priority to German Patent Application No. 102012218611.5, filed on Oct. 12, 2012, the entire contents of which are hereby incorporated by reference for all purposes.

FIELD

The present description relates to a method for regenerating an adsorber. The adsorber serves to purify exhaust gas of a motor vehicle which comprises a hybrid drive with an internal combustion engine and an electric machine.

BACKGROUND AND SUMMARY

Adsorbers, in particular NOx adsorbers, are known. Referred to as LNT, short for lean NOx traps, these adsorbers remove nitrogen oxides (NOx) from exhaust gases of internal combustion engines. NOx adsorbers have, inter alia, an adsorption means, for example barium oxide and/or other oxides and/or carbonates and bind chemically nitrogen oxides from an exhaust gas of the internal combustion engine in a lean operating mode of the internal combustion engine. Adsorbers are, in particular, installed in the coating of a catalytic converter. If the capacitance of the adsorber is saturated, it is regenerated in a phase in which the internal combustion engine is operated in a rich fashion, and the released NOx is reduced to nitrogen by means of the catalytic converter. A method for rinsing an NOx adsorber is described, for example, in DE 102 49 017 A1.

In addition, hybrid drives with a combination of an internal combustion engine and at least one electric machine are also known in motor vehicle engineering.

An object of the present description is to improve regeneration methods of the abovementioned type with the aid of hybrid technology.

The regeneration method according to the description serves to regenerate an adsorber, connected downstream of an internal combustion engine, of a motor vehicle with a hybrid drive train. The internal combustion engine is operated in a phase of rich combustion for regeneration of the adsorber. According to the description, for the rich combustion an engine load and/or an engine rotational speed of the internal combustion engine is influenced by means of an electric machine which can be coupled mechanically to the internal combustion engine. It is therefore advantageously possible to influence the running of the internal combustion engine with respect to the rich combustion according to demand.

In one advantageous refinement, the description provides that in at least one mode in the regeneration method an initial operating point of the internal combustion engine which is in a range which is unsuitable for the rich combustion is shifted to a target operating point in an operating range which is suitable for the rich combustion. It is therefore advantageously not necessary to wait for an operating state which is suitable for the rich operating mode, but instead it can be selectively brought about, independently of the initial operating state of the internal combustion engine. Regeneration is therefore possible more frequently and more appropriately in terms of demand. The adsorber can therefore be more easily placed in a regenerated state, and further exhaust gas components are therefore better available for the adsorption.

In one particular refinement of the regeneration method according to the description there is provision that in a first mode an initial operating point of the internal combustion engine which is in a range of excessively low engine load, which is unsuitable for the rich combustion, is shifted to a target operating point in an operating range which is suitable for the rich combustion by virtue of the fact that the internal combustion engine additionally drives the electric machine as a generator. The engine load is therefore additionally increased. In particular, the electric machine recharges, as a generator, an accumulator here.

Conversely, in a further particular refinement of the regeneration method according to the description there is provision that in a second mode an initial operating point of the internal combustion engine which is in a range of excessively high engine load, which is unsuitable for the rich combustion, is shifted to the target operating point in the operating range by virtue of the fact that an electric machine is additionally operated as a motor in parallel with the internal combustion engine, and the engine load is therefore decreased.

As a result, operating states of the internal combustion engine, in which otherwise no regeneration could take place owing to unfavorable engine loads, can be specifically compensated for.

In one further particular refinement of the regeneration method according to the description there is provision that in a third mode an initial operating point of the internal combustion engine which is in a range of excessively low engine rotational speed, which is unsuitable for the rich combustion, is shifted to the target operating point in the operating range by virtue of the fact that the engine rotational speed is increased.

Conversely, in a further particular refinement of the regeneration method according to the description there is provision that in a fourth mode an initial operating point of the internal combustion engine which is in a range of excessively high engine rotational speed, which is unsuitable for the rich combustion, is shifted to the target operating point in the operating range by virtue of the fact that the engine rotational speed is decreased. As a result, operating states of the internal combustion engine, in which otherwise no regeneration could take place owing to unfavorable engine rotational speeds, can be specifically compensated for.

In a further particular refinement of the regeneration method according to the description there is provision that in a fifth mode an initial operating point of the internal combustion engine which is in an operating range, which is suitable for the rich combustion, is shifted to a target operating point at a location in the operating range which is optimum for the rich combustion by virtue of the fact that the engine rotational speed is decreased or increased and/or the engine load is decreased or increased.

It is therefore advantageously possible to carry out the regeneration in an optimum range of the operating range. As a result, disadvantages such as excessively high fuel consumption, thinning of the engine oil, excessively high $CO_2$ emissions and smoke emissions can be avoided. Stable running of the engine compared to non-optimum operating points is also ensured here. Furthermore, excessively high exhaust gas temperatures can be advantageously avoided in order to protect the exhaust gas turbocharger and the exhaust gas post-treatment systems connected downstream.

In a further particular refinement of the regeneration method according to the description there is provision that in a sixth mode torque of the internal combustion engine is compensated during the rich combustion by torque of the electric machine operated in the engine operating mode. In particular, the sixth mode is carried out subsequent to the other modes if the target operating point is reached. As a result, fluctuations in the torque of the internal combustion engine during the rich combustion can be advantageously compensated for. The motor vehicle carries on running uniformly without adverse effects on comfort.

The regeneration method according to the description is preferably applied in a motor vehicle. The motor vehicle has at least one electric machine, one accumulator, which is electrically connected to the electric machine, one internal combustion engine which can be mechanically coupled to the or one electric machine by means of a distributor unit, one adsorber which is connected downstream of the internal combustion engine, and one management unit. The motor vehicle according to the description is designed to carry out the method according to the description.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
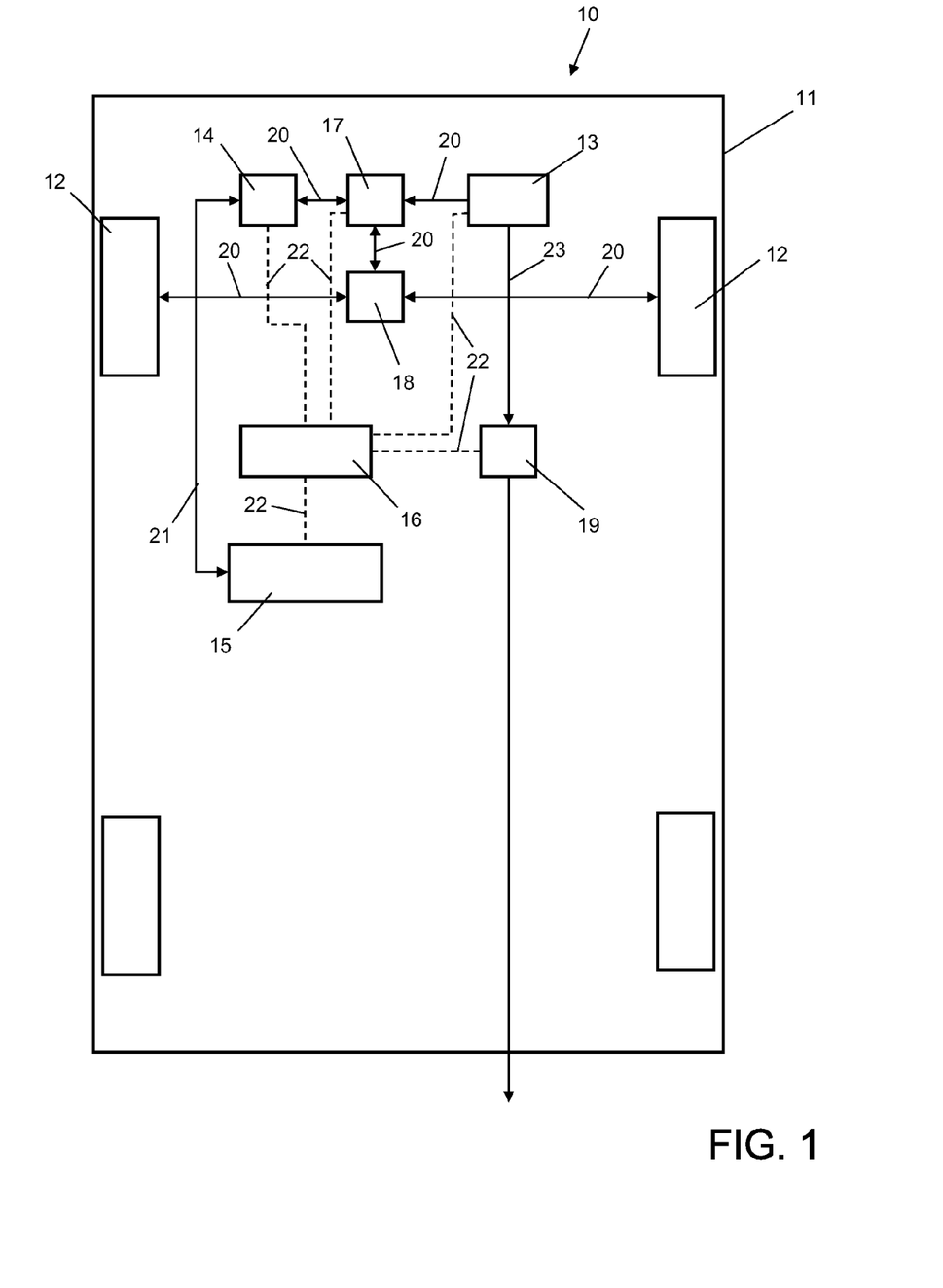
FIG. 1 is a schematic diagram of a motor vehicle according to the description.
Figure 2:
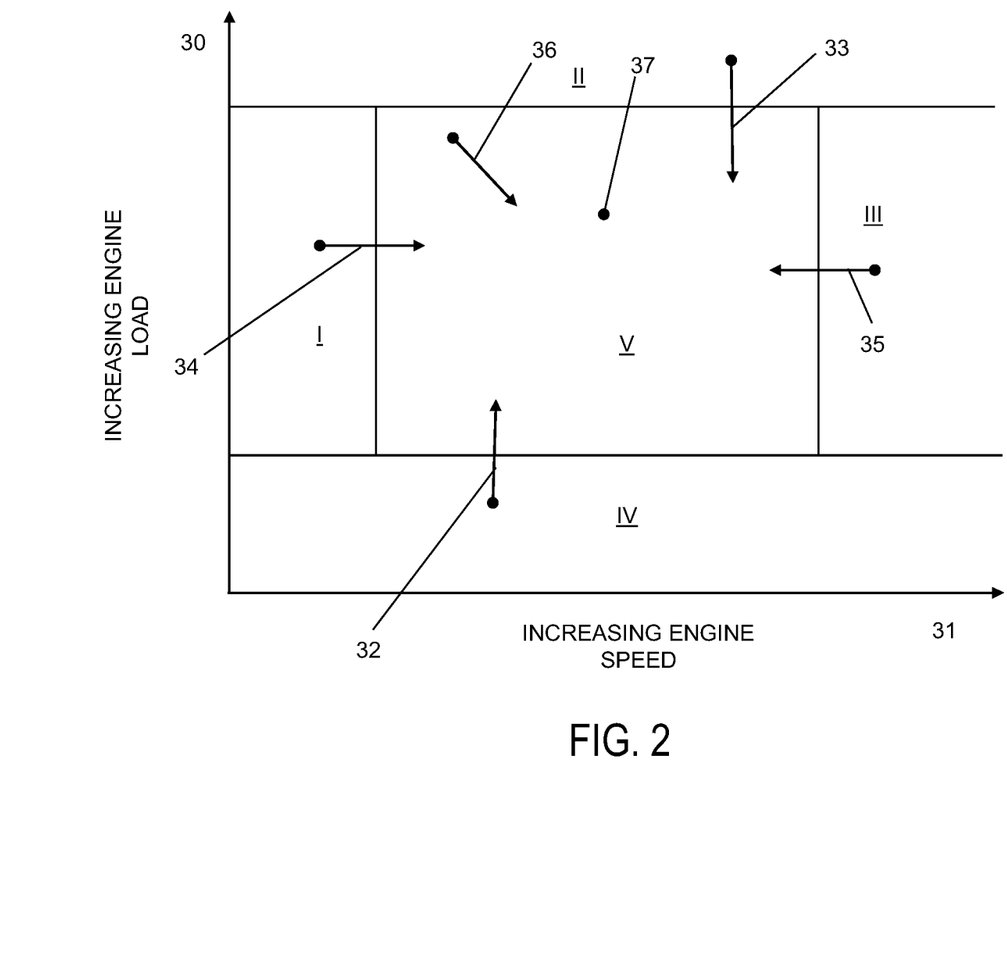
FIG. 2 shows various modes of the regeneration method in a diagram.
Figure 3:
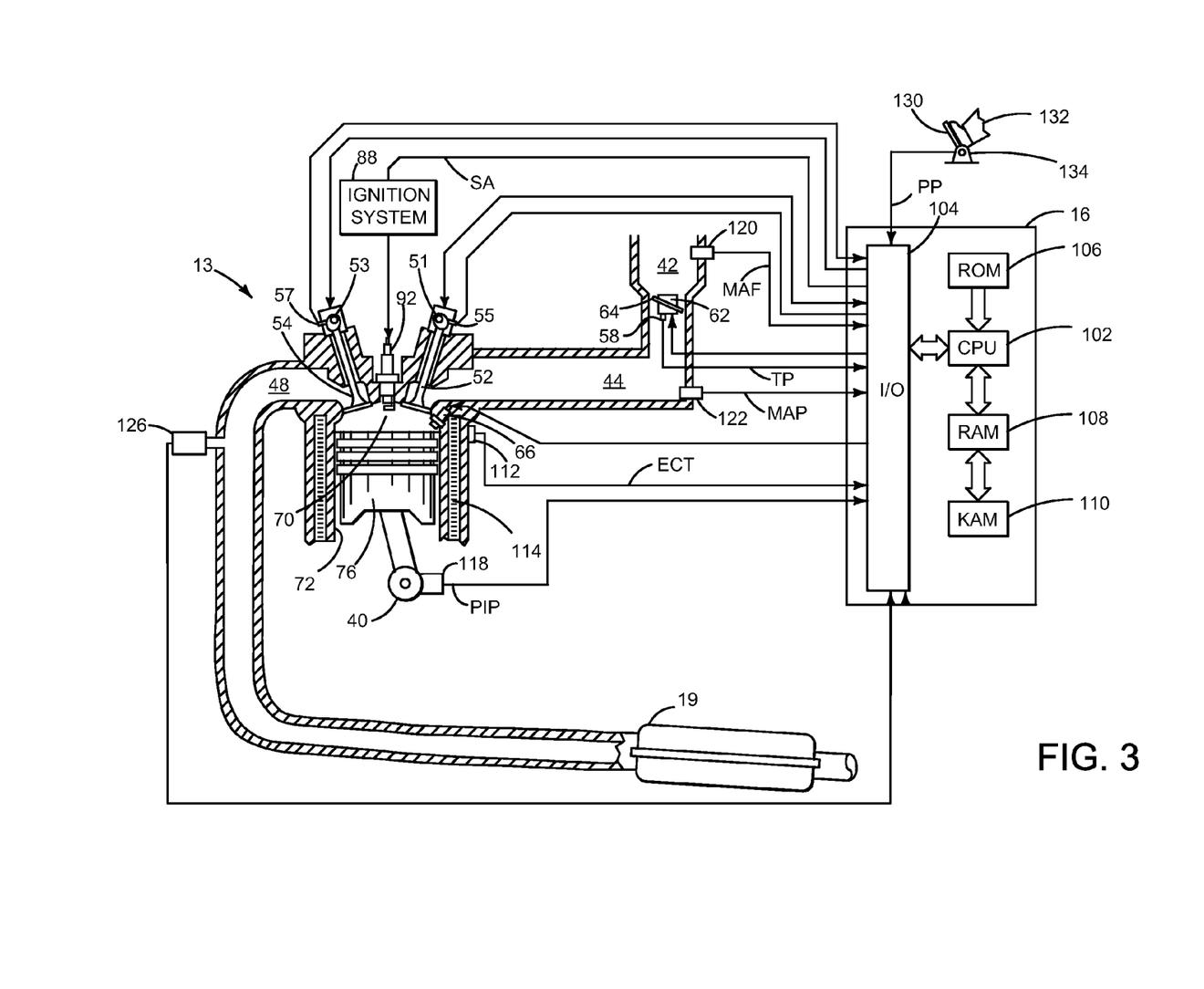
FIG. 3 shows a detailed view of an internal combustion engine.

The present description is related to regeneration of an emissions control device for a hybrid vehicle. FIG. 1 shows one example vehicle configuration according to the present description. Regeneration of the emissions control device may occur in modes shown in FIG. 2. A method for regenerating the emissions device is shown in FIG. 3.

FIG. 1 shows a motor vehicle with a hybrid drive train 11 according to the description with its components, and interaction of the components according to an inventive regeneration method 10.

The motor vehicle 11 according to the description has a hybrid drive train and has at least one electric machine 14 and one internal combustion engine 13. The electric machine 14 and the internal combustion engine 13 are mechanically coupled, if appropriate by means of a distributor unit 17. The latter takes up the mechanical energy of the internal combustion engine 13 and of the electric machine 14 and passes it on to the drive unit 18. The drive unit 18 passes on the mechanical and/or electrical energy 20 to the wheels 12, as a result of which propulsion of the motor vehicle 11 is generated.

The distributor unit 17 permits flexible distribution of the generation of the torque for the internal combustion engine 13 and electric machine 14 here. Parallel and serial drive of the motor vehicle 11 by the internal combustion engine 13 and electric machine 14 are possible.

The at least one electric machine 14 is electrically connected to an accumulator 15. In order to operate the electric machine 14 as a motor, the electric machine is supplied with electrical energy 21 by the accumulator 15. In the generator operating mode, the electric machine conducts electrical energy 21 to the accumulator. According to the description, two electric machines can also be arranged, wherein one is configured for an engine operating mode and the other for a generator operating mode.

The internal combustion engine 13 draws fuel necessary for its operation from a fuel tank (not illustrated). The internal combustion engine 13 is operated in a normal operating mode with a lean fuel/air mixture, that is to say a mixture in which the proportion of air is higher than in a stoichiometric mixture. The fuel/air mixture is set by suitable means and measures which are prior art.

During operation of the internal combustion engine 13, exhaust gas 23 is produced which is conducted away via an exhaust system. The exhaust system comprises an adsorber 19, which takes up, in particular, the nitrogen oxides (NOx) and sulfur oxides (SOx) from the exhaust gas 23 and collects them up to its capacity limit. Once the capacity limit is reached, a scavenging method has to be carried out which regenerates the adsorber and, in particular, converts the adsorbed nitrogen oxides into environmentally more desirable elements which are then discharged into the surroundings. The scavenging method itself is prior art.

So that the scavenging method can be carried out, a specific temperature must be present in the adsorber 19 (for example DeNox 200° C.<T<550° C. for DeSOx T>660° C.) and the internal combustion engine 13 has to be operated with a rich fuel/air mixture (for example in the range $0.93 \leq \lambda \leq 0.96$), that is to say with a mixture with a higher proportion of fuel than in the normal operating mode. As a result of the operation of the internal combustion engine with a rich fuel/air mixture, the exhaust gas 23 contains the necessary components for regeneration of the adsorber 19.

The operation of the internal combustion engine 13 with a rich fuel/air mixture is not possible or favorable at every operating point of the internal combustion engine. The rich operating state is therefore possible at all only in a specific load range and a specific rotational speed range, and it is not optimum at every location in this range. The various ranges I to V are shown in FIG. 2.

The regeneration method 10 according to the description provides shifting of the operating point of the internal combustion engine 13, from an initial operating point, unsuitable for rich combustion, to a suitable target operating point, or from an initial operating point which is less optimum for rich combustion to a more favorable target operating point.

The shifting of the operating point according to the description is initiated by a management unit 16 which is in contact at least with the electric machine 14, the internal combustion engine 13, the distributor unit 17 and the adsorber 19 and exchanges data 22 therewith.

The regeneration method 10 according to the description has, in particular, various modes 32 to 37 depending on the initial operating point of the internal combustion engine 13. In FIG. 2, the various modes 32 to 37 of the regeneration method 10 according to the description are illustrated in a diagram.

The diagram according to FIG. 2 maps an engine load 30 of the internal combustion engine 13 on the ordinate against an engine rotational speed 31 of the internal combustion engine 13 on the abscissa of the diagram. The ranges I to IV show zones in which a rich operating mode of the internal combustion engine 13 is not possible owing to excessively high feed gas emission values being reached, NVH or unstable combustion or owing to temperature limiting values of the hardware being reached. Range V constitutes an operating range in which rich operating modes are possible.

In the case of an excessively low engine load 30, the internal combustion engine 13 is in a range with excessively low engine load IV. In the case of excessively high engine load 30, the internal combustion engine 13 is in a range with excessively high engine load II. In the case of an excessively low engine rotational speed 31, the internal combustion engine 13 is in a range with an excessively low engine rotational speed I. And in the case of an excessively high engine rotational speed 31, the internal combustion engine 13 is in a range with an excessively high engine rotational speed III, in order to be operated with a rich fuel/air mixture.

The regeneration method 10 according to the description comprises, in particular, a first mode 32. The initial operating point is in the range of excessively low engine load IV here. In order to shift the operating point from the initial operating point to the target operating point in the operating range V, according to the description the engine load 30 is increased by virtue of the fact that the internal combustion engine 13 additionally also drives the at least one electric machine 14 as a generator for charging the accumulator 15.

The regeneration method 10 according to the description additionally comprises, in particular, a second mode 33. The initial operating point is in the region of excessively high engine load II here. In order to shift the operating point from the initial operating point to the target operating point in the operating range V, according to the description the engine load 30 is decreased by virtue of the fact that the electric machine 14, operated as a motor, also drives the motor vehicle 11 and additionally assists the internal combustion engine 13.

The regeneration method 10 according to the description comprises, in particular, a third mode 34. The initial operating point is in the range of an excessively low engine rotational speed I here. In order to shift the operating point from the initial operating point to the target operating point in the operating range V, according to the description the engine rotational speed 31 is increased.

The regeneration method 10 according to the description comprises, in particular, a fourth mode 35. The initial operating point is in the range of an excessively high engine rotational speed III here. In order to shift the operating point from the initial operating point to the target operating point in the operating range V, according to the description the engine rotational speed 31 is decreased. This is relevant, in particular, in types of hybrid in which the rotational speed of the internal combustion engine can be adjusted (power split systems or serial hybrid). It is also conceivable to change the gear selection in automated transmission.

The engine rotational speed 31 of the internal combustion engine 13 is increased or decreased if the internal combustion engine 13 runs decoupled from the electric machine 14.

The regeneration method 10 according to the description comprises, in particular, a fifth mode 36. Although the initial operating point is in the operating range V, it is not at an optimum location. In order to shift the operating point from the initial operating point to the target operating point, according to the description the engine load 30 and/or the engine rotational speed 31 are/is adapted. It is possible to use all the previously described procedures here.

The regeneration method 10 according to the description comprises, in particular, a sixth mode 37. Although the initial operating point is at an optimum location in the operating range V, in order to safeguard stable running of the internal combustion engine 13 a torque of the internal combustion engine 13 is temporarily compensated by the electric machine 14 without shifting of the operating point taking place. It is therefore possible for rich combustion to influence the operating point of the internal combustion engine 13 little, it is kept stable by the electric machine. Safeguarding takes place which, according to the description, is carried out in particular in the case of every rich operating state, that is to say according to other modes.

Referring now to FIG. 3, a more detailed example of internal combustion engine 13 is shown. Internal combustion engine 13 may be comprised of a plurality of cylinders, one cylinder of which is shown in FIG. 3, is controlled by electronic engine controller 16. Engine 13 includes combustion chamber 70 and cylinder walls 72 with piston 76 positioned therein and connected to crankshaft 40. Combustion chamber 70 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into combustion chamber 70, which is known to those skilled in the art as direct injection. Alternatively, fuel may be injected to an intake port, which is known to those skilled in the art as port injection. Fuel injector 66 delivers liquid fuel in proportion to the pulse width of signal from controller 16. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 16. Universal Exhaust Gas Oxygen (UEGO) sensor 126 is shown coupled to exhaust manifold 48 upstream of adsorber 19. Alternatively, a two-state exhaust gas oxygen sensor may be substituted for UEGO sensor 126. Adsorber 19 can include multiple catalyst bricks, in one example. In another example, multiple emission control devices, each with multiple bricks, can be used.

Controller 16 is shown in FIG. 3 as a conventional microcomputer including: microprocessor unit 102, input/output ports 104, read-only memory 106, random access memory 108, keep alive memory 110, and a conventional data bus. Controller 16 is shown receiving various signals from sensors coupled to engine 13, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 16. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 1.

During operation, each cylinder within engine 13 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 70 via intake manifold 44, and piston 76 moves to the bottom of the cylinder so as to increase the volume within combustion chamber 70. The position at which piston 76 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 76 moves toward the cylinder head so as to compress the air within combustion chamber 70. The point at which piston 76 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber.

In a process hereinafter referred to as ignition, the injected fuel is ignited by known ignition means such as spark plug 92, resulting in combustion. During the expansion stroke, the expanding gases push piston 76 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 4:
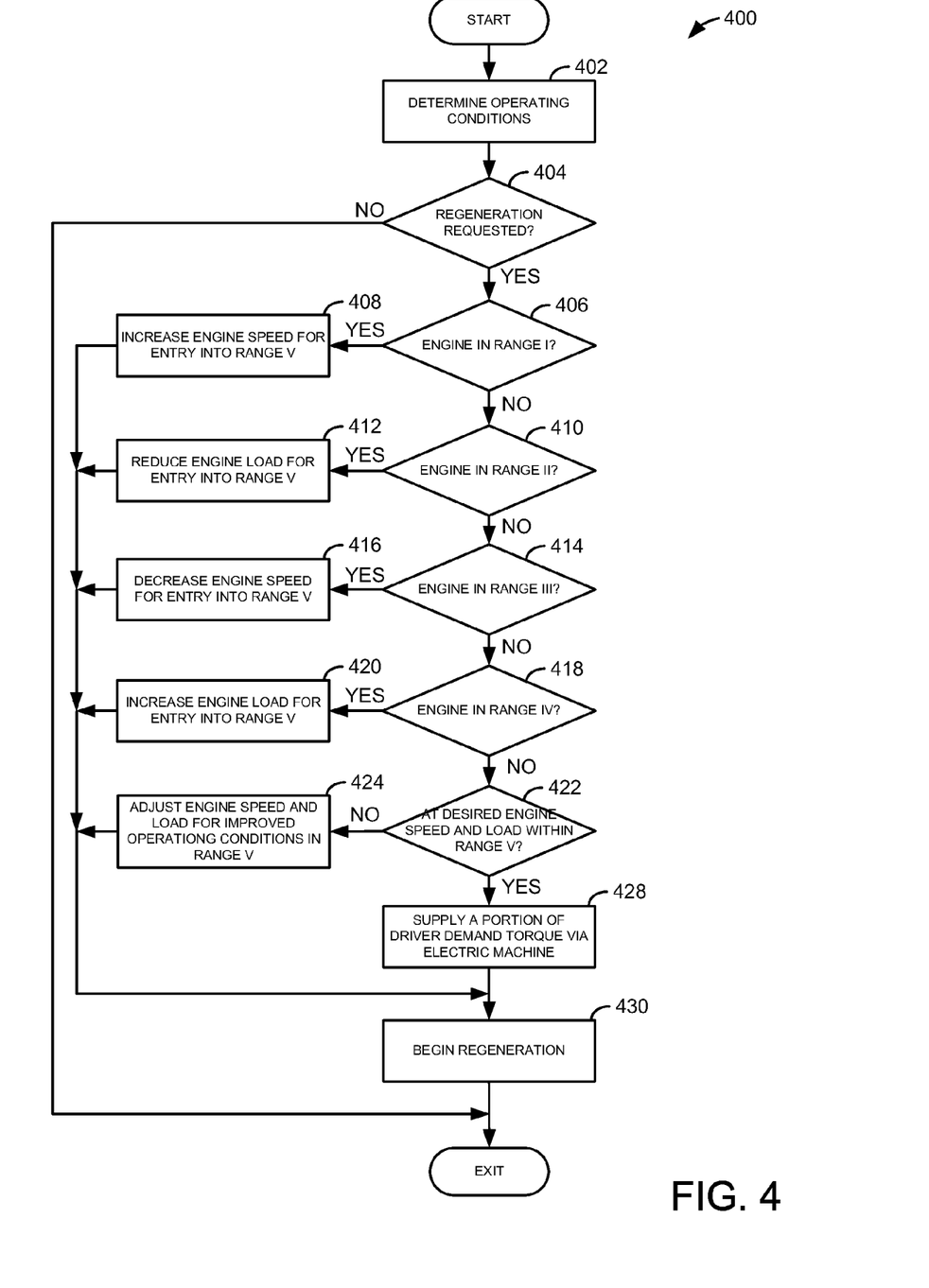
FIG. 4 shows flowchart of a regeneration method.

Referring now to FIG. 4, a flowchart of a regeneration method is shown. The method of FIG. 4 may be provided in the system of FIGS. 1 and 3 as executable instructions stored in non-transitory memory.

At 402, method 400 determines operating conditions. Operating conditions may include but are not limited to driver demand torque, engine speed, engine load, LNT state, engine temperature, and ambient environmental conditions. Driver demand torque may be determined via a position of an accelerator pedal. Method 400 proceeds to 404 after operating conditions are determined.

At 404, method 400 judges whether or not regeneration of an after treatment device is requested or desirable. In one example, method 400 may judge whether or not after treatment device regeneration is desirable based on an estimated amount of NOx stored in a LNT. If method 400 judges that regeneration is requested or desired, the answer is yes and method 400 proceeds to 406. Otherwise, the answer is no and method 400 proceeds to exit.

At 406, method 400 judges whether or not the engine is operating in range I as shown in FIG. 2. Range I is an engine speed load range where engine speed is less than is desired for regenerating an after treatment device. If method 400 judges that the engine is operating in range I, the answer is yes and method 400 proceeds to 408. Otherwise, the answer is no and method 400 proceeds to 410.

At 408, method 400 moves the engine from range I to range V via increasing engine speed. In one example, engine speed may be increased via supplying a portion of driver demand torque via electric machine 14. The engine torque is maintained so that the engine is accelerated from range I to range V. In this way, the driver demand torque may be provided via the engine and the electric machine while at the same time, the engine operating conditions are adjusted to conditions that better support emission device regeneration. Method 400 proceeds to 430 after engine operating conditions are adjusted.

At 410, method 400 judges whether or not the engine is operating in range II as shown in FIG. 2. Range II is an engine speed load range where engine load is greater than is desired for regenerating an after treatment device. If method 400 judges that the engine is operating in range II, the answer is yes and method 400 proceeds to 412. Otherwise, the answer is no and method 400 proceeds to 414.

At 412, method 400 moves the engine from range II to range V via decreasing engine load. Engine load may be expressed as a ratio of inducted engine air mass to the theoretical engine air mass. In one example, engine load may be decreased via reducing the engine air and fuel amounts while supplying a portion of driver demand torque via electric machine 14. In this way, the driver demand torque may be provided via the engine and the electric machine while at the same time, the engine operating conditions are adjusted to conditions that better support emission device regeneration. Method 400 proceeds to 430 after engine operating conditions are adjusted.

At 414, method 400 judges whether or not the engine is operating in range III as shown in FIG. 2. Range III is an engine speed load range where engine speed is greater than is desired for regenerating an after treatment device. If method 400 judges that the engine is operating in range III, the answer is yes and method 400 proceeds to 416. Otherwise, the answer is no and method 400 proceeds to 418.

At 416, method 400 moves the engine from range III to range V via decreasing engine speed. In one example, engine speed may be decreased via increasing a load applied to the engine via electric machine 14 while driver demand torque is maintained and supplied to the transmission input. The engine torque is maintained while engine speed is reduced via applying additional load to the engine via the electric machine. Controlling driveline torque this way allows the engine to decelerate from range III to range V. In this way, the driver demand torque may be provided via the engine and the electric machine while at the same time, the engine operating conditions are adjusted to conditions that better support emission device regeneration. Method 400 proceeds to 430 after engine operating conditions are adjusted.

At 418, method 400 judges whether or not the engine is operating in range IV as shown in FIG. 2. Range IV is an engine speed load range where engine load is less than is desired for regenerating an after treatment device. If method 400 judges that the engine is operating in range IV, the answer is yes and method 400 proceeds to 420. Otherwise, the answer is no and method 400 proceeds to 422.

At 420, method 400 moves the engine from range IV to range V via increasing engine load. In one example, engine load may be increased via increasing the throttle opening amount and engine fuel amount. The electrical machine may convert the increase in engine torque into electrical energy so that driver demand torque supplied to the transmission input is the desired driver demand torque and so that engine speed does not increase. Controlling driveline torque this way allows engine load to increase from range IV to range V without increasing engine speed. In this way, the driver demand torque may be provided via the engine and the electric machine while at the same time, the engine operating conditions are adjusted to conditions that better support emission device regeneration. Method 400 proceeds to 430 after engine operating conditions are adjusted.

At 422, method 400 judges whether or not the engine is operating at a desired engine speed and load within range V as shown in FIG. 2. If method 400 judges that the engine is not operating at a desired speed and load, the answer is no and method 400 proceeds to 424. Otherwise, the answer is yes and method 400 proceeds to 428.

At 424, method 400 moves the engine from an undesirable speed and load to a desired speed and load within range V. In one example, engine load may be increased via increasing the throttle opening amount and engine fuel amount. Similarly, engine load may be decreased via closing the throttle and reducing the engine fuel amount. Engine speed may be increased or decreased via increasing or decreasing the load that the electric machine applies to the engine. In this way, the driver demand torque may be provided via the engine and the electric machine while at the same time, the engine operating conditions are adjusted to conditions that better support emission device regeneration. Method 400 proceeds to 430 after engine operating conditions are adjusted.

At 430, method 400 begins regeneration of the emissions control device. In one example, the engine may be operated with a rich air-fuel mixture to facilitate emission device regeneration. Further, in some examples, the engine air-fuel ratio may be modulated between richer and less rich conditions to promote emissions device regeneration. Method 430 proceeds to exit after emission device regeneration begins.

Thus, the method of FIG. 4 provides for regenerating an adsorber, comprising: operating an engine in a range where engine operation is unsuitable for rich combustion for regenerating the adsorber; and adjusting engine operation to a range where engine operation is suitable for rich combustion for regenerating the absorber in response to a request to regenerate the adsorber, engine operation adjusted via changing a load that an electrical machine applies to the engine. The method includes where engine speed is increased via decreasing a load applied to the engine via an electric machine and maintaining a desired driver demand torque. The method includes where engine load is increased via opening a throttle while engine speed is maintained via increasing a load an electric machine applies to the engine.

In some examples, the method includes where engine load is decreased via closing a throttle while engine speed is maintained via decreasing a load an electric machine applies to the engine. The method includes where engine speed is decreased via increasing a load applied to the engine via an electric machine and maintaining a desired driver demand torque. The method further comprises regenerating an emissions device via operating the engine with a rich air-fuel mixture. For example, the method may include operate lean (e.g., leaner than a threshold such as 16:1) during the unsuitable for rich conditions, and only after adjusting the electric machine and achieving the new, lower, engine speed while maintaining driver demanded torque, adjusting the air-fuel ratio of combustion to be rich (e.g., richer than 14:1).

LIST OF REFERENCE SYMBOLS

10 Regeneration method
11 Motor vehicle
12 Wheel
13 Internal combustion engine
14 Electric machine
15 Accumulator
16 Management unit
17 Distributor unit
18 Output unit
19 Adsorber
20 Mechanical energy
21 Electrical energy
22 Data
23 Exhaust gas
30 Engine load
31 Engine rotational speed
32 First mode
33 Second mode
34 Third mode
35 Fourth mode
36 Fifth mode
37 Sixth mode
40 Crankshaft
42 Air intake
44 Intake manifold
48 Exhaust manifold
51 Intake cam
52 Intake poppet valve
53 Exhaust cam
54 Exhaust poppet valve
55 Intake valve position sensor
57 Exhaust valve position sensor
58 Throttle position sensor
62 Electronic throttle
64 Throttle plate
66 Fuel injector
70 Combustion chamber
72 Cylinder walls
76 Piston
88 Ignition system
92 Spark plug
104 Input/output
106 Read only memory (non-transitory memory0
108 Random access memory
110 Keep alive memory
112 Engine coolant temperature sensor
114 Coolant passage
118 Crankshaft position sensor
120 Air mass sensor
122 Manifold pressure sensor
126 Oxygen sensor
130 Accelerator pedal
134 Accelerator pedal sensor
132 Driver
I Range of excessively low engine rotational speed
II Range of excessively high engine load
III Range of excessively high engine rotational speed
IV Range of excessively low engine load
V Operating range As will be appreciated by one of ordinary skill in the art, the method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A regeneration method for regenerating an adsorber, connected downstream of an internal combustion engine, of a motor vehicle with a hybrid drive train, wherein the internal combustion engine is operated in a phase of rich combustion for regeneration of the adsorber, wherein an engine load and/or an engine rotational speed of the internal combustion engine for the rich combustion is influenced via an electric machine which can be coupled mechanically to the internal combustion engine, comprising;
   a first mode where an initial operating point of the internal combustion engine which is in a range of excessively low engine load, which is unsuitable for the rich combustion, is shifted to a target operating point in an operating range which is suitable for the rich combustion by virtue of the fact that the internal combustion engine additionally drives the electric machine as a generator, and therefore the engine load is increased and further the electric machine which is operated as the generator recharges an accumulator; and
   a second mode where an initial operating point of the internal combustion engine which is in a range of excessively high engine load, which is unsuitable for the rich combustion, is shifted to the target operating point in the operating range by virtue of the fact that the electric machine is additionally operated as a motor in parallel with the internal combustion engine, and the engine load is therefore decreased.

2. The regeneration method of claim 1, where in a third mode an initial operating point of the internal combustion engine which is in a range of excessively low engine rotational speed, which is unsuitable for the rich combustion, is shifted to the target operating point in the operating range by virtue of the fact that the engine rotational speed is increased.

3. The regeneration method of claim 2, where in a fourth mode an initial operating point of the internal combustion engine which is in a range of excessively high engine rotational speed, which is unsuitable for the rich combustion, is shifted to the target operating point in the operating range by virtue of the fact that the engine rotational speed is decreased.

4. The regeneration method of claim 3, where in a fifth mode an initial operating point of the internal combustion engine which is in an operating range, which is suitable for the rich combustion, is shifted to a target operating point at a location in the operating range which is optimum for the rich combustion by virtue of the fact that the engine rotational speed is decreased or increased and/or the engine load is decreased or increased.

5. The regeneration method of claim 4, where in a sixth mode torque of the internal combustion engine is compensated during the rich combustion by torque of the electric machine operated in an engine operating mode.

6. A method for regenerating an adsorber, comprising:
   operating an engine in a range where engine operation is unsuitable for rich combustion for regenerating the adsorber;
   adjusting engine operation to a target range where engine operation is suitable for rich combustion for regenerating the adsorber in response to a request to regenerate the adsorber, engine operation adjusted via changing a load that an electric machine applies to the engine;
   in a first mode, shifting to the target range by increasing engine load responsive to the engine being in a range of low engine load unsuitable for rich combustion;
   recharging an accumulator via the electric machine operating as a generator; and
   in a second mode, shifting to the target range by decreasing engine load responsive to the engine being in a range of high engine load unsuitable for rich combustion.

7. The method of claim 6, where engine speed is increased via decreasing the load applied to the engine via the electric machine and maintaining a desired driver demand torque.

8. The method of claim 6, where engine load is increased via opening a throttle while engine speed is maintained via increasing the load the electric machine applies to the engine.

9. The method of claim 6, where engine load is decreased via closing a throttle while engine speed is maintained via decreasing the load the electric machine applies to the engine.

10. The method of claim 6, where engine speed is decreased via increasing the load applied to the engine via the electric machine and maintaining a desired driver demand torque.

11. The method of claim 6, further comprising regenerating an emissions device via operating the engine with a rich air-fuel mixture.

* * * * *